Oct. 17, 1933.  J. KUBLER  1,930,979
REGULATING SYSTEM FOR ALTERNATING CURRENT CIRCUITS
Filed Dec. 11, 1930
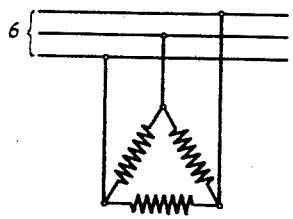
Fig. 1.
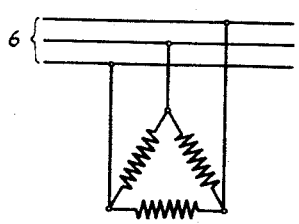
Fig. 2.
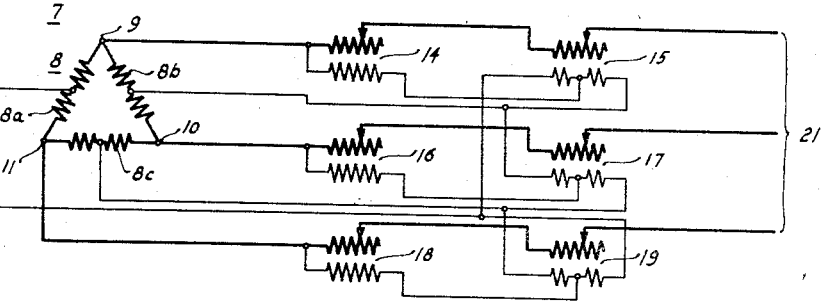
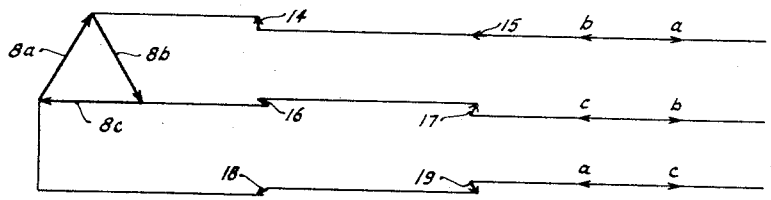
Fig. 3.
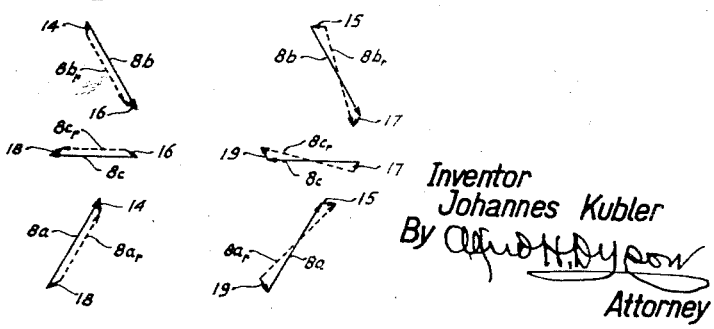
Inventor
Johannes Kubler
By
Attorney Patented Oct. 17, 1933

1,930,979

UNITED STATES PATENT OFFICE

1,930,979

REGULATING SYSTEM FOR ALTERNATING CURRENT CIRCUITS

Johannes Kubler, Baden, Switzerland, assignor to Aktiengesellschaft Brown, Boveri & Cie, Baden, Switzerland, a joint-stock company of Switzerland Application December 11, 1930, Serial No. 501,557, and in Germany December 12, 1929

4 Claims. (Cl. 172—238)

This invention relates to voltage regulating systems wherein both the angle and the magnitude of the voltage vector of the several phases of a polyphase alternating current line are regulated.

The present invention provides an arrangement by which the angle and magnitude of the voltage vector of a polyphase line may be simultaneously regulated or may be regulated in sequence. Briefly stated, the delta connected secondary windings of a transformer are tapped at the midpoint. In one embodiment of the invention, series regulating transformers are connected to the midpoints and the corner points of the windings to be regulated to regulate the angles and the magnitude of the voltage vector; the primary of the transformer regulating the angle of the voltage vector being connected across one of the phases to be regulated, the primary of the transformer regulating the magnitude of the voltage vector being connected with the midpoint and the corner point opposite one of the phases to be regulated while the adjustable secondaries of the regulating transformers are connected in series. In another embodiment of the invention, the primary windings of the regulating transformers regulating the magnitude voltage vector are connected to a corner point of the secondary windings opposite the phases to be regulated and to the midpoint of the primary of the angle vector regulating transformer winding which is itself connected across the midpoint of the phases of the main secondary windings to be regulated.

The invention will be readily comprehended by reference to the accompanying drawing, when read in connection with the following description, in which drawing Figure 1 diagrammatically illustrates one embodiment of the present invention, Fig. 2 shows a simplified modification of the present invention, and Fig. 3 shows the vector relations of the several phases obtaining in the embodiment according to Figure 1.

Referring to the drawing by characters of reference, the reference numeral 6 designates a polyphase alternating current supply line, connected with the primary winding 7 of a transformer, to be regulated. The secondary winding 8 of the transformer is delta connected and the several phases thereof are indicated at 8a, 8b and 8c. The corner connection points of the several phases of the secondary winding 8 are designated at 9, 10 and 11 and each of the phase windings 8a, 8b and 8c are tapped at their respective midpoints.

A pair of series connected regulating transformers 14, 15; 16, 17; 18, 19 are connected with the secondary winding 8 for the purpose of regulating the phases 8a, 8b and 8c respectively. The transformers 14, 16 and 18 are arranged to regulate the magnitude of the phase voltage vectors and transformers 15, 17 and 19 are arranged to regulate the angles of the phase voltage vectors of the several phases. The secondary windings of all of the regulating transformers are adjustable and are connected in series with an alternating current feeder line designated at 21.

The arrangement and connections of each pair of the regulating transformers i. e. the transformers for regulating the magnitude and the phase angle of the voltage vector being similar, the connections of only one pair of the transformers namely the transformers 14 and 15 will be described in detail. Considering the connections of the transformer 14, the primary winding thereof is connected between the midpoint of the phase 8c and the corner point 9 of the secondary winding 8 which corner point is opposite the midpoint of the winding 8c. The primary winding of the phase angle regulating transformer 15 is connected across the phase 8c of the secondary winding 8 at the corner points 10 and 11. One end of the secondary winding of the transformer 14 is connected with the corner point 9 of the main secondary windings and is adjustably connected with the secondary winding of the transformer 15 which is itself adjustably connected with one phase conductor of the polyphase feeder line 21.

Regulation of the angle of the voltage vector of the phase 8b will now be described in detail, it being understood that the various portions of the structure shown cooperate to secure regulation of the vectors of the other phases in a similar manner. Regulation of the angle voltage vector of the phase 8b is obtained by adjustment of the secondaries of the transformers 15 and 17 which regulation slightly varies the magnitude of the corresponding voltage vector. The magnitude of the voltage vector is then regulated by adjustment of the secondaries of the transformers 14 and 16 which are connected in series with the secondaries of the transformers 15 and 17. It will be understood that the secondaries of the transformers 14, 16 and 18 as well as the secondaries of the transformers 15, 17 and 19 are simultaneously adjustable to secure proper regulation of both the angle and the magnitude of the voltage vectors of all phases of the secondary winding 8.

The relations of the several voltage vectors may readily be seen from the vector diagram shown in Fig. 3 which illustrates both the angle and magnitude relations of the several phases. The angle of the vector of the phase 8b is regulated by the simultaneous or sequential regulation of the secondaries of the transformers 14, 16 and 15, 17. Tracing the diagram shown in the direction of the arrow-heads thereon marked b, it will be seen that the magnitude vectors 14 and 16 when plotted relative to the vector 8b will yield a resultant 8br which is less than the former vector 8b and the angle vectors 15 and 17 when plotted relative to the angle vector 8b will yield a resultant angle vector 8br which differs in direction from that of the original angle vector 8b. Reference to the other portions of the vector diagram of Fig. 3 will show that the vector relations of the other phases are similarly adjustable and are similarly changed by the same operation of adjusting the secondaries of the regulating transformers.

In the embodiment shown in Figure 2, the primary windings of the magnitude vector regulating transformers 14, 16 and 18 are connected to a corner point of the secondary winding 8 opposite the phases to be regulated by each pair of regulating transformers and are likewise connected to the midpoint of the angle voltage vector regulating primary windings of the transformers 15, 17 and 19 which are themselves connected across the midpoints of the phases of the secondary winding 8 to be regulated. The connections required are thus simplified and the voltages on the primary windings of the regulating transformers are reduced to one-half of the values present on the same winding when connected as shown in Fig. 1 thus greatly simplifying and reducing the insulation required in the regulating transformers.

Although but two embodiments of the present invention have been illustrated and described, it will be apparent to those skilled in the art that various changes and modifications may be made therein without departing from the spirit of the invention or from the scope of the appended claims.

The invention claimed is:

1. In a system for regulating alternating current circuits, in combination with a polyphase line, and a transformer having mid-tapped delta connected phase windings operative to impress potentials on the phase conductors of said line, of means operative to regulate the phase angles of the said phase conductors of said line comprising a transformer for each phase conductor having a secondary winding serially connected in circuit between its associated phase conductor and an end terminal of its associated said delta connected winding, and a primary winding connected with the end terminals of another of said delta connected windings, means operative to regulate the magnitude of said potentials comprising a transformer for each of said phase conductors having a secondary winding serially connected in circuit between its associated phase conductor and an end terminal of its associated said delta connected winding, the primary winding of each of the last said transformers being connected with an end terminal of its associated delta connected winding and the mid-point tap of another of said delta connected windings, each of said secondary windings being provided with taps, and means operative to selectively vary the connections to said taps to thereby vary the effective turns of said secondary windings.

2. In a system for regulating alternating current circuits, in combination with a polyphase line, and a transformer having windings operable to impress potentials differing in phase angle on the respective phase conductors of said line, of means operable to regulate the phase angle and the magnitude of the potentials impressed on said conductors comprising a plurality of transformers for each said conductor having secondary windings connected in series therewith and primary windings impressed with potentials of the same frequency as the frequency of the potential impressed upon the associated one of said conductors with respect to the potentials impressed on the others of said conductors by the first said transformer but differing therefrom in phase angle, each said secondary winding being provided with a plurality of tap connections, and means operable to selectively vary the connections to said taps to thereby vary the effective turns of said secondary windings.

3. In a system for regulating alternating current circuits, in combination with a polyphase line, and means operable to impress potentials differing in phase angle on the respective phase conductors of said line, of means operable to regulate the phase angle and magnitude of the potentials impressed on said conductors comprising a plurality of transformers for each said conductor having secondary windings connected in series therewith and primary windings impressed with potentials of the same frequency as the frequency of the potentials impressed upon the associated one of said conductors with respect to potentials impressed on the others of said conductors by the first said means but differing therefrom in phase angle, and means operable to vary the ratio of transformation between said secondary windings and the corresponding said primary windings.

4. In a system for regulating alternating current circuits, in combination with a line comprising a plurality of phase conductors, and means operable to impress voltages differing in phase angle on the respective ones of said conductors, of means for regulating the angle and magnitude of the voltage vector of the respective said conductors comprising a pair of regulating transformers for each of said conductors having secondary windings connected in series therewith and primary windings impressed with voltages such as to induce in the respective said secondary windings voltages differing in phase angle by 90 electrical degrees from each other and each differing in phase angle from the voltage impressed on the associated said conductor by the first said means with respect to the voltages impressed thereby on the others of said conductors, and means operable to vary the ratio of transformation between said secondary windings and the associated said primary windings.

JOHANNES KUBLER.